United States Patent
Ogawa et al.

(10) Patent No.: US 8,213,529 B2
(45) Date of Patent: Jul. 3, 2012

(54) METHOD FOR MIMO DECODING, APPARATUS FOR MIMO DECODING, AND MIMO RECEIVER

(75) Inventors: Daisuke Ogawa, Kawasaki (JP); Takashi Dateki, Kawasaki (JP); Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 12/686,081

(22) Filed: Jan. 12, 2010

(65) Prior Publication Data

US 2010/0124299 A1    May 20, 2010

Related U.S. Application Data

(63) Continuation of application No. PCT/JP2007/065001, filed on Jul. 31, 2007.

(51) Int. Cl.
*H04L 1/02* (2006.01)
(52) U.S. Cl. ........................................ 375/267
(58) Field of Classification Search .......... 375/267, 375/299, 347, 349; 700/53; 455/101, 132–141
See application file for complete search history.

(56) References Cited

U.S. PATENT DOCUMENTS

| | | | |
|---|---|---|---|
| 6,754,264 B1 * | 6/2004 | Ben Rached et al. | 375/232 |
| 7,289,585 B2 * | 10/2007 | Sandhu et al. | 375/347 |
| 2004/0028157 A1 | 2/2004 | Aoki et al. | |
| 2008/0256426 A1 * | 10/2008 | Reid et al. | 714/801 |

FOREIGN PATENT DOCUMENTS

| | | |
|---|---|---|
| JP | 2003-273837 | 9/2003 |
| JP | 2005-176020 | 6/2005 |

OTHER PUBLICATIONS

Zhang et al. Equal-Diagonal QR Decomposition and its Application to Precoder Design for Successive-Cancellation Detection, IEEE, vol. 51, No. 1, Jan. 2-5, p. 154-172.*
Zhang et al. Equal-Diagonal QR Decomposition and its Application to Precoder Design for Successive-Cancellation Detection, IEEE, vol. 51, No. 1, 2005, p. 154-172.*
D. Wubben, et al.; "Efficient Algorithm for Detecting Layered Space-Time Codes"; 4th International ITG Conference on Source and Channel Coding, Berlin, Germany, Jan. 2002.
W. Jiang, et al.; "MMSE Criterion Fast Decision Feedback Equalization Algorithm for Spatial Multiplexing Systems"; Sep. 2006; Vehicular Technology Conference, 2006; VTC-2006 Fall. 2006 IEEE 64th; pp. 1-5. [Ref.: ISR mailed Sep. 4, 2007].

(Continued)

*Primary Examiner* — Sam K Ahn
(74) *Attorney, Agent, or Firm* — Myers Wolin, LLC (57) ABSTRACT

There is provided a method for MIMO decoding, based on a channel estimated value between a plurality of transmitting antennas and a plurality of receiving antennas, a received signal received by the plurality of receiving antennas, including: in obtaining a unitary matrix Q and a triangular matrix R through QR decomposition of a channel estimated value matrix H, creating the triangular matrix R such that a sum of scalars of non-diagonal elements of the triangular matrix R is the minimum; and estimating a signal transmitted from the plurality of transmitting antennas through the use of the created triangular matrix R, the unitary matrix Q, and the received signal received by the plurality of receiving antennas.

9 Claims, 6 Drawing Sheets

OTHER PUBLICATIONS

H. Lee, et al.; "A Novel Detection Algorithm using the Sorted QR Decomposition based on Log-Likelihood ratio in V-BLAST Systems"; Sep. 4, 2006; Wireless Communications, Networking and Mobile Computing, 2006; WiCOM 2006 International Conference; pp. 1-4. [Ref.: ISR mailed Sep. 4, 2007].

K. Higuchi, et al.; "Adaptive Selection Algorithm of Surviving Symbol Replica Candidates in QRM-MLD for MIMO Multiplexing Using OFCDM Wireless Access"; The Institute of Electronics Information and Communication Engineers; Technical Report of IEICE; RCS2004-69; Dated May 2004. English Abstract attached.

International Search Report for corresponding International Application No. PCT/JP2007/065001, mailed Sep. 4, 2007.

* cited by examiner

PATTERN #1

$$\begin{pmatrix} h_{11} & h_{12} & h_{13} \\ h_{21} & h_{22} & h_{23} \\ h_{31} & h_{32} & h_{33} \end{pmatrix} \rightarrow \begin{pmatrix} r_{11}^{(1)} & r_{12}^{(1)} & r_{13}^{(1)} \\ 0 & r_{22}^{(1)} & r_{23}^{(1)} \\ 0 & 0 & r_{33}^{(1)} \end{pmatrix}$$

PATTERN #2

$$\begin{pmatrix} h_{11} & h_{13} & h_{12} \\ h_{21} & h_{23} & h_{22} \\ h_{31} & h_{33} & h_{32} \end{pmatrix} \rightarrow \begin{pmatrix} r_{11}^{(2)} & r_{12}^{(2)} & r_{13}^{(2)} \\ 0 & r_{22}^{(2)} & r_{23}^{(2)} \\ 0 & 0 & r_{33}^{(2)} \end{pmatrix}$$

PATTERN #3

$$\begin{pmatrix} h_{12} & h_{11} & h_{13} \\ h_{22} & h_{21} & h_{23} \\ h_{32} & h_{31} & h_{33} \end{pmatrix} \rightarrow \begin{pmatrix} r_{11}^{(3)} & r_{12}^{(3)} & r_{13}^{(3)} \\ 0 & r_{22}^{(3)} & r_{23}^{(3)} \\ 0 & 0 & r_{33}^{(3)} \end{pmatrix}$$

PATTERN #4

$$\begin{pmatrix} h_{12} & h_{13} & h_{11} \\ h_{22} & h_{23} & h_{21} \\ h_{32} & h_{33} & h_{31} \end{pmatrix} \rightarrow \begin{pmatrix} r_{11}^{(4)} & r_{12}^{(4)} & r_{13}^{(4)} \\ 0 & r_{22}^{(4)} & r_{23}^{(4)} \\ 0 & 0 & r_{33}^{(4)} \end{pmatrix}$$

PATTERN #5

$$\begin{pmatrix} h_{13} & h_{11} & h_{12} \\ h_{23} & h_{21} & h_{22} \\ h_{33} & h_{31} & h_{32} \end{pmatrix} \rightarrow \begin{pmatrix} r_{11}^{(5)} & r_{12}^{(5)} & r_{13}^{(5)} \\ 0 & r_{22}^{(5)} & r_{23}^{(5)} \\ 0 & 0 & r_{33}^{(5)} \end{pmatrix}$$

PATTERN #6

$$\begin{pmatrix} h_{13} & h_{12} & h_{11} \\ h_{23} & h_{22} & h_{21} \\ h_{33} & h_{32} & h_{31} \end{pmatrix} \rightarrow \begin{pmatrix} r_{11}^{(6)} & r_{12}^{(6)} & r_{13}^{(6)} \\ 0 & r_{22}^{(6)} & r_{23}^{(6)} \\ 0 & 0 & r_{33}^{(6)} \end{pmatrix}$$

$$(1)\begin{bmatrix} h_{11} & h_{12} & h_{13} \\ h_{21} & h_{22} & h_{23} \\ h_{31} & h_{32} & h_{33} \end{bmatrix} \Rightarrow (2)\begin{bmatrix} r_{11} & r_{12} & r_{13} \\ 0 & h'_{22} & h'_{23} \\ 0 & h'_{32} & h'_{33} \end{bmatrix} \Rightarrow (3)\begin{bmatrix} r_{11} & r_{12} & r_{13} \\ 0 & h'_{22} & h'_{23} \\ 0 & h'_{32} & h'_{33} \end{bmatrix} \Rightarrow (4)\begin{bmatrix} r_{11} & r_{12} & r_{13} \\ 0 & r_{22} & r_{23} \\ 0 & 0 & r_{33} \end{bmatrix}$$

METHOD FOR MIMO DECODING, APPARATUS FOR MIMO DECODING, AND MIMO RECEIVER

CROSS-REFERENCE TO RELATED APPLICATION

This application is a continuation Application of a PCT international application No. PCT/JP2007/065001 filed on Jul. 31, 2007 in Japan, the entire contents of which are incorporated by reference.

FIELD

The embodiments discussed herein are related to a method for MIMO (Multiple Input Multiple Output) decoding, an apparatus for MIMO decoding, and a MIMO receiver used in MIMO wireless communication.

BACKGROUND

For the technology of the next-generation communication, MIMO transmitting has been intensively developed. The technique of MIMO improves a transmission capacity through the use of a number of transmitting antennas and a number of receiving antennas. In MIMO communication, signals transmitted from a number of transmitting antennas are received in a state of being jammed, by respective receiving antennas in a receiver.

Figure 5:
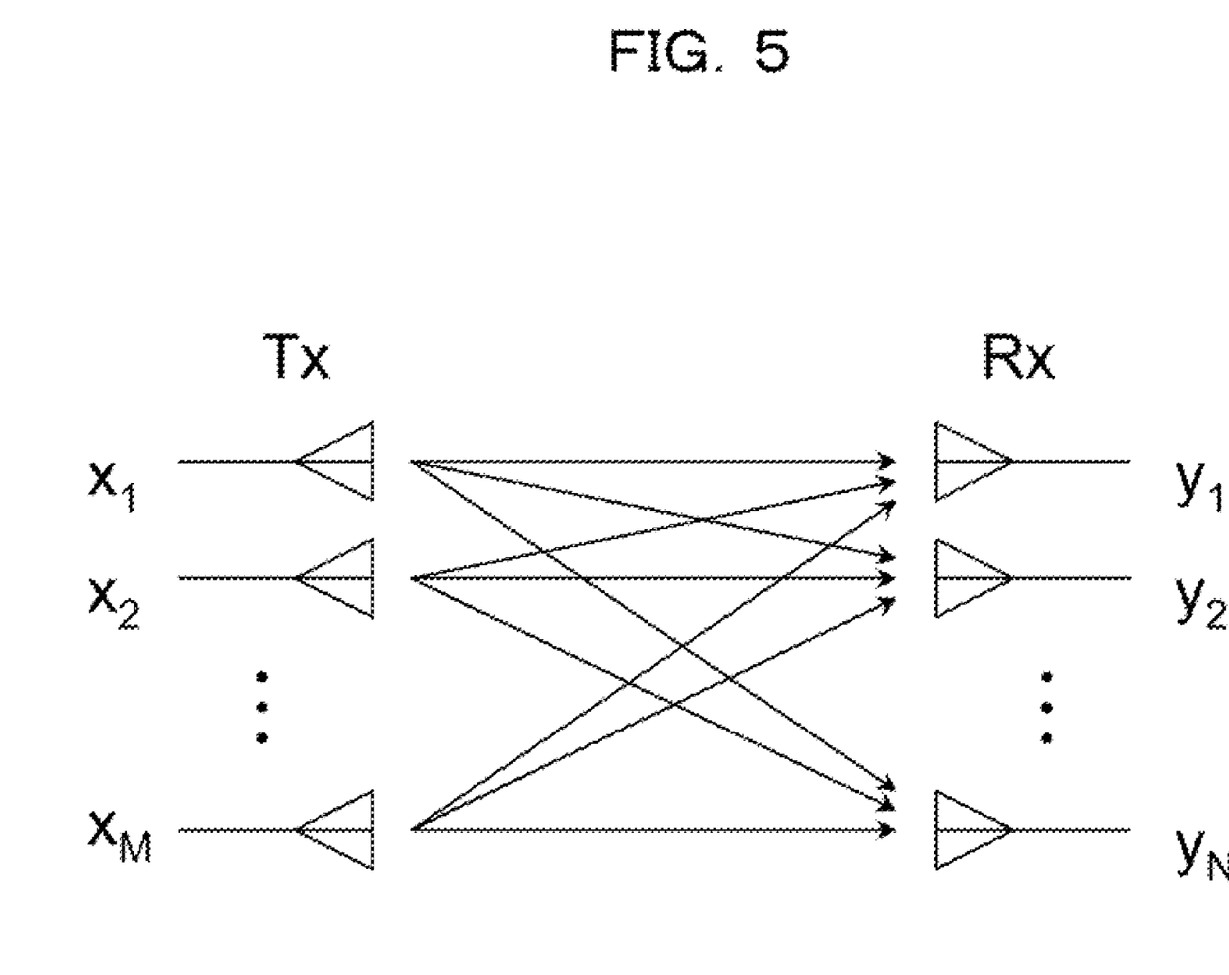
FIG. 5 is a schematic diagram denoting an M×N MIMO communication system.

FIG. 5 illustrates MIMO communication system having a number M of transmitting antennas and a number N of receiving antennas. The transmitter end (Tx) transmits transmitting signals $x_1, x_2, \ldots,$ and $x_M$ through M transmitting antennas and the receiver end (Rx) receives received signals $y_1, y_2, \ldots,$ and $y_N$.

Here, the received signals $y_i$ (i=1 through N) received by the receiving antennas #i can be represented by the following formula (1) where a channel value between the transmitting antenna #j (j=1 through M) and the receiving antenna #i is represented by $h_{ij}$.

$$r_i = \sum_{j=1}^{M} h_{ij} d_j \qquad (1)$$

Accordingly, the received signals by the receiving antennas #1 through #N are represented by the following formula (2).

$$\begin{bmatrix} y_1 \\ y_2 \\ \vdots \\ y_N \end{bmatrix} = \begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix} \begin{bmatrix} x_1 \\ x_2 \\ \vdots \\ x_M \end{bmatrix} \qquad (2)$$

The formula (2) becomes the following formula (3) when the received signal vector, the transmitted signal vector, and the matrix are represented by the symbols y, x, and H, respectively.

$$y = Hx \qquad (3)$$

Here, the transmitted signal vector x, the received signal vector y, and the matrix (channel matrix) H are represented by the following formulae (4), (5), and (6), respectively. The symbol T in the formulae (4) and (5) represents transposition.

$$x = [x_1 \ x_2 \ \cdots \ x_M]^T \qquad (4)$$

$$y = [y_1 \ y_2 \ \cdots \ y_N]^T \qquad (5)$$

$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix} \qquad (6)$$

At the receiver end, the transmitted signals, which have been transmitted in the form of being jammed through the channel and then received, need to be separated from one another (hereinafter called MIMO decoding). The transmitted signal vector x is estimated from the received signal vector y and the channel matrix H of the formula (3).

There have been proposed various methods for MIMO decoding, such as MLD (Maximum Likelihood Detection), MMSE (Minimum Mean Square Error), and V-BLAST(Vertical—Bell Laboratories Layered Space Time).

In the meantime, methods have been proposed in which transmitted signals are easily estimated through the use of QR decomposition in MIMO decoding (see, for example, Patent Reference 1, and Non-Patent References 1 and 2 below).

Specifically, since the channel matrix H is decomposed into a unitary matrix (orthogonal matrix) Q and an upper triangular matrix R through QR decomposition, as denoted in the following formula (7), multiplication of the above formula (3) on the right by the unitary matrix $Q^H$ obtains the following formula (8). An upper triangular matrix is one whose bottom-left elements below the diagonal are zero.

$$H = QR \qquad (7)$$

$$\begin{aligned} z &= Q^H y \\ &= Q^H (QR)x \\ &= Rx \end{aligned} \qquad (8)$$

Thereby, the received signals z are identical to products of the transmitted signals x and the upper triangular matrix R, which makes it easier to estimate the transmitted signals.

There have already been proposed some methods of MIMO decoding using QR decomposition; for example, Non-Patent Reference 1 realizes the estimation of transmitted signal by yielding only a small amount of calculation because of a combination with MLD.

Further, Non-Patent Reference 2 proposes a method of adopting a LST (Layered Space Time) architecture and thereby enhancing the reception capability.

In a 3×3 MIMO system having the number of transmitting antennas and the number of receiving antennas both being three, for example, a method using QR decomposition converts the formula (2) into the following formula (9), and obtains the following formula (10) through the use of QR decomposition.

$$\begin{bmatrix} y_1 \\ y_2 \\ y_3 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_1 \\ x_2 \\ x_3 \end{bmatrix} \qquad (9)$$

$$\begin{bmatrix} z_1 \\ z_2 \\ z_3 \end{bmatrix} = \begin{bmatrix} r_{11} & r_{12} & r_{13} \\ 0 & r_{22} & r_{23} \\ 0 & 0 & r_{33} \end{bmatrix} \begin{bmatrix} x_1 \\ x_2 \\ x_3 \end{bmatrix} \quad (10)$$

The QR decomposition is carried out in conformity with the Gram-Schmidt orthgonalization with the result that a unitary matrix Q and an upper triangular matrix R are obtained from the channel matrix H.

In a 3×3 MIMO system, the Gram-Schmidt orthgonalization results in the upper triangular matrix R and the unitary matrix Q being represented by the following formulae (11) and (12), respectively.

$$R = \begin{bmatrix} r_{11} & r_{12} & r_{13} \\ 0 & r_{22} & r_{23} \\ 0 & 0 & r_{33} \end{bmatrix} = \begin{bmatrix} |u_1| & q_1^H h_2 & q_1^H h_3 \\ 0 & |u_2| & q_2^H h_3 \\ 0 & 0 & |u_3| \end{bmatrix} \quad (11)$$

$$Q = [\, q_1 \quad q_2 \quad q_3 \,], q_i = [\, q_{1i} \quad q_{2i} \quad q_{3i} \,]^T \quad (12)$$

where, $$H = [\, h_1 \quad h_2 \quad h_3 \,], h_i = [\, h_{1i} \quad h_{2i} \quad h_{3i} \,]^T \quad (13)$$

$$u_i = h_i - \sum_{j=1}^{i-1}(q_j^H h_i) q_j \quad (14)$$

$$q_i = \frac{u_i}{|u_i|} \quad (15)$$

The symbol H in the element $q_j^H$ represents a complex conjugate.

The transmitted signals are sequentially estimated specifically by firstly estimating $x_3$ from the above formula (10), then estimating $x_2$ on the basis of the estimated $x_3$, and finally estimating $x_1$ on the basis of both $x_3$ and $x_2$.

Here, it is preferable that the accuracy of the estimation of $x_3$ is increased as high as possible in consideration of the procedure in which $x_3$ is firstly estimated and $x_2$ is estimated on the basis of the estimated $x_3$. For the above, the element $r_{33}$ in an upper triangular matrix preferably has a larger value as large as possible.

Manipulation of elements in the upper triangular matrix R needs interchanging column vectors of the channel matrix H. For example, interchanging the second column with the third column of the channel matrix H of the formula (9) results in the following formula (16), which is then QR-decomposed into the following formula (17).

$$\begin{bmatrix} y_1 \\ y_2 \\ y_3 \end{bmatrix} = \begin{bmatrix} h_{11} & h_{13} & h_{12} \\ h_{21} & h_{23} & h_{22} \\ h_{31} & h_{33} & h_{32} \end{bmatrix} \begin{bmatrix} x_1 \\ x_3 \\ x_2 \end{bmatrix} \quad (16)$$

$$\begin{bmatrix} z'_1 \\ z'_2 \\ z'_3 \end{bmatrix} = \begin{bmatrix} r'_{11} & r'_{12} & r'_{13} \\ 0 & r'_{22} & r'_{23} \\ 0 & 0 & r'_{33} \end{bmatrix} \begin{bmatrix} x_1 \\ x_3 \\ x_2 \end{bmatrix} \quad (17)$$

Here, differently from the upper triangular matrix of the above formula (10), the upper triangular matrix of the formula (17) preferably selects a larger element $r_{33}$ from the viewpoint of error propagation in the process of estimation of transmitted signals.

Actually, Non-Patent Reference 2 proposes a method of improving the reception capability by interchanging columns of the channel matrix X such that the element $r_{33}$ is larger and then QR decomposition.

Patent Reference 1: Japanese Patent Publication No. 2003-273837

Non-Patent Reference 1: Kenichi HIGUCHI et al., "Adaptive Selection Algorithm of Surviving Symbol Replica Candidates in QRM-MLD for MIMO Multiplexing Using OFCDM Wireless Access", Technical Report of IEICE, RCS2004-69, May, 2004

Non-Patent Reference 2: D. Wubben J, at et al., "Efficient Algorithm for Detecting Layered Space-Time Codes", 4th International ITG conference on source and channel and coding, Berlin, January 2002

Figure 6:
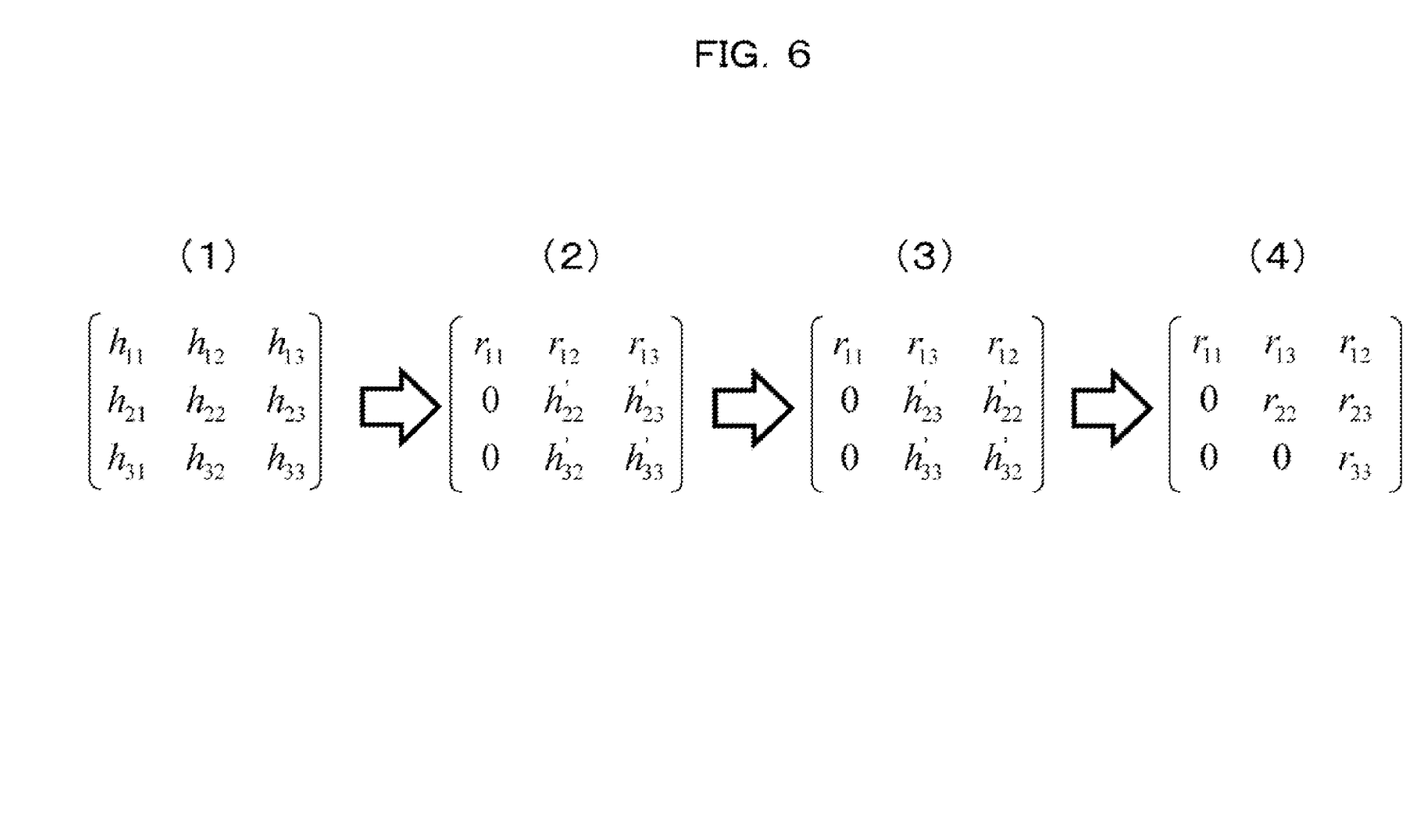
FIG. 6 is a diagram describing a manner of generating an upper triangular matrix R in the process of QR decomposition in Non-Patent Reference 2.

The method of Non-Patent Reference 2 controls the diagonal elements of an upper triangular matrix to be larger (by interchanging columns) in the process of the QR decomposition. Description will now be made with reference to FIG. 6, assuming a 3×3 matrix. Firstly, each column vector of the matrix H in FIG. 6(1) is subjected to the following calculation:

$$|h_{11}|^2+|h_{21}|^2+|h_{31}|^2, |h_{12}|^2+|h_{22}|^2+|h_{32}|^2, |h_{13}|^2+|h_{23}|^2+|h_{33}|^2$$

As a consequence, a column corresponding to the minimum value of these three sums is determined.

In this example, the first column is assumed to be the minimum and, as depicted in FIG. 6(2), is subjected to the calculation in order to be converted into $[r_{11},0,0]^T$.

Next, for the second and the third columns, the sums of the squares of respective column vectors are similarly calculated to find the smaller sum. This example assumes the third column is smaller and, as denoted in FIG. 6(3), the second column is interchanged with the third column to create the upper triangular matrix as denoted in FIG. 6(4).

This method creates an upper triangular matrix, focusing only on the diagonal elements with the intention of lessening an error of $X_3$ by increasing the element $r_{33}$ in the formula (10) as large as possible.

However, the method focuses only on the diagonal elements as described above, in other words, does not take the remaining elements in consideration. Consequently, the accuracy of the estimation of $x_3$ is insufficient, and in the event of occurrence of an error in $x_3$, the same error propagates to the subsequent judgment on the transmitting signals, so that the required capability of reception (decoding) cannot be obtained.

SUMMARY (1) According to an aspect of the embodiments, a method includes a method for MIMO decoding, based on a channel estimated value between a plurality of transmitting antennas and a plurality of receiving antennas, a received signal received by the plurality of receiving antennas, the method including: in a process of obtaining a unitary matrix Q and a triangular matrix R through QR decomposition of a channel estimated value matrix H, creating the triangular matrix R such that a sum of scalars of non-diagonal elements of the triangular matrix R is the minimum; and estimating a signal transmitted from the plurality of transmitting antennas through the use of the created triangular matrix R, the unitary matrix Q, and the received signal received by the plurality of receiving antennas.

(2) According to an aspect of the embodiments, an apparatus includes an apparatus for MIMO decoding, based on a channel estimated value between a plurality of transmitting antennas and a plurality of receiving antennas, a received signal received by the plurality of receiving antennas, the apparatus including: a QR decomposing unit which creates, in a process of obtaining a unitary matrix Q and a triangular matrix R through QR decomposition of a channel estimated value matrix H, the triangular matrix R such that a sum of scalars of non-diagonal elements of the triangular matrix R is the minimum; and a MIMO decoding unit which estimates a signal transmitted from the plurality of transmitting antennas through the use of the created triangular matrix R, the unitary matrix Q, and the received signal received by the plurality of receiving antennas.

(3) According to an aspect of the embodiments, an apparatus includes a MIMO receiver includes the apparatus for MIMO decoding described in above.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a diagram denoting patterns of an upper triangular matrix for description of generation of an upper triangular matrix R by a QR decomposing unit of FIG. 1;

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

Figure 1:
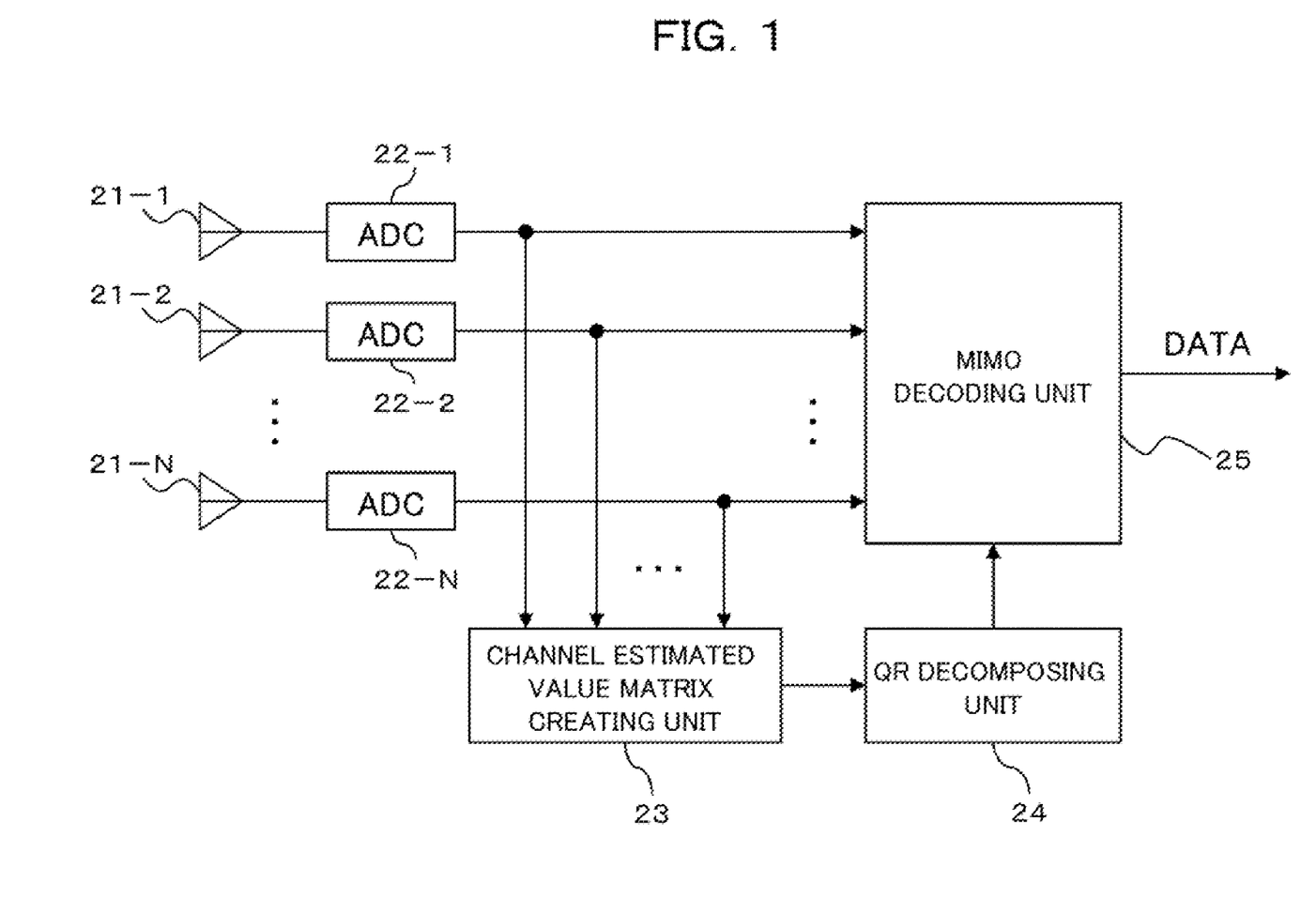
FIG. 1 is a block diagram illustrating the configuration of a part of a MIMO receiver according to a first embodiment.

[1] First Embodiment:

FIG. 1 is a block diagram illustrating the configuration of a part of a MIMO receiver according to a first embodiment. The MIMO receiver of FIG. 1 includes, for example, a number (N) of receiving antennas 21-1 through 21-N, and a number of AD convertors (ADCs) 22-$i$, provided one for each receiving antenna 21-$i$ ($i$=1 through N), a channel estimated value matrix creating unit 23, a QR decomposing unit 24, and a MIMO decoding unit 25. The illustration of a MIMO transmitter is omitted here, but the MIMO transmitter includes a number (M) of transmitting antennas similarly to one illustrated in FIG. 5, so that there is provided an M×N MIMO system including the MIMO transmitter and the MIMO receiver.

Here, each receiving antenna 21-$i$ receives signals transmitted from M transmitting antennas included in the MIMO transmitter. Each ADC 22-$i$ converts a signal received by the corresponding receiving antenna into a digital signal. FIG. 1 omits the illustration of predetermined reception processing, such as low noise amplification and frequency conversion from wireless frequency to baseband frequency, carried out prior to the AD conversion.

The channel estimated value matrix creating unit 23 has a function of calculating estimated values ($h_{ij}$) of a channel which couples the N receiving antennas 21-$i$ with the M transmitting antennas and creating a channel matrix (H) having the channel estimated values as the elements. The channel estimated values can be obtained on the basis of a signal, such as a pilot signal, already known to the MIMO transmitter and the MIMO receiver.

The QR decomposing unit 24 has a function of creating a unitary matrix Q and an upper triangular matrix R through QR decomposition of the channel matrix. In order to lessen the affect caused by error propagation of possible error at a element $x_3$ in a transmitter signal vector, the first embodiment focuses on the elements except for the diagonal elements, that is, the non-diagonal elements $r_{12}$, $r_{13}$, and $r_{23}$ in the above formula (10), and creates an upper triangular matrix R such that these non-diagonal elements is smaller. It is thereby possible to improve the reception capability.

The MIMO decoding unit 25 has a function of MIMO decoding by estimating transmitted signals based on the received signals from the ADC 22-$i$, and the unitary matrix Q and the upper triangular matrix R, which have been obtained by the QR decomposing unit 24, through the use of the above formula (8). The MIMO decoding unit 25 serves as a MIMO decoder in conjunction with the QR decomposing unit 24.

Hereinafter, description will now be made focusing on the operation of the MIMO receiver having the above configuration, in particular, QR decomposition in the QR decomposing unit 24. The following description assumes a 3×3 MIMO system whose the number M of transmitting antennas being three and the number N of receiving antennas being three, but the embodiment can also be applied to a generic M×N MIMO system.

The QR decomposing unit 24 calculates the square ($|\cdot|^2$) of the absolute value of each upper triangular element not being zero of an upper triangular matrix R except the diagonal elements (that is, this calculation corresponds to calculation of electric power), and creates the upper triangular matrix R such that the total sum of the calculated squares (sum of electric power (sum of scalars)) is smaller and concurrently creates an unitary matrix Q to be used for conversion of the channel matrix H into the created upper triangular matrix R.

For example, in determination of the 3×3 upper triangular matrix R, there are six patterns #$k$ (i.e., $k$=1 through 6) of possible interchanging of column vectors, as denoted in FIG. 2. The QR decomposing unit 24 obtains an upper triangular matrix R and a unitary matrix Q for each of the six patterns and calculates sums of the squares of elements (the elements enclosed by dotted triangles in FIG. 2) except for the diagonal elements of the respective six upper triangular matrix R.

$$|r_{12}^{(k)}|^2 + |r_{13}^{(k)}|^2 + |r_{23}^{(k)}|^2$$

where, $k$=1,2, ... ,6

Finally, among the created candidates, an upper triangular matrix R having the minimum sum of the squares is selected as (determined to be) the one that is to be used for MIMO decoding.

The QR decomposition may be carried out by the Gram-Schmidt orthgonalization. Alternatively, Householder transformation may be similarly applied because the transformation obtains the same six patterns of the results (an upper triangular matrix R and a unitary matrix Q) of QR decomposition.

The MIMO decoding unit 25 estimates transmitted signals from the above formula (8), using the thus determined upper triangular matrix R, the corresponding unitary matrix Q, and signals received from the ADC 22-$i$.

As described above, the MIMO receiver of the first embodiment focuses on elements of an upper triangular matrix R other than the diagonal elements, that are the non-diagonal elements ($r_{12}$, $r_{13}$, $r_{23}$) in the above formula (10), and creates the upper triangular elements such that these non-diagonal elements are small. In the event of occurrence of an error on an element $x_3$ of a transmitted signal vector, this configuration can reduce the affect caused by error propagation, so that the accuracy of estimation of transmitted signals, that is, the capability of MIMO decoding is improved and thereby the capability of reception is also improved.

In the above example, in a process of determining the upper triangular matrix R, the electric power ($|\cdot|^2$) of the respective upper triangular elements except for the diagonal elements are calculated and the upper triangular matrix R can be determined (created) on the basis of the total sum of the calculated electric power. Alternatively, the upper triangular matrix R may be determined (created) based on the sum of the amplitudes ($|\cdot|$) (i.e., the sum of the scalars) of the non-diagonal elements.

Figure 3:
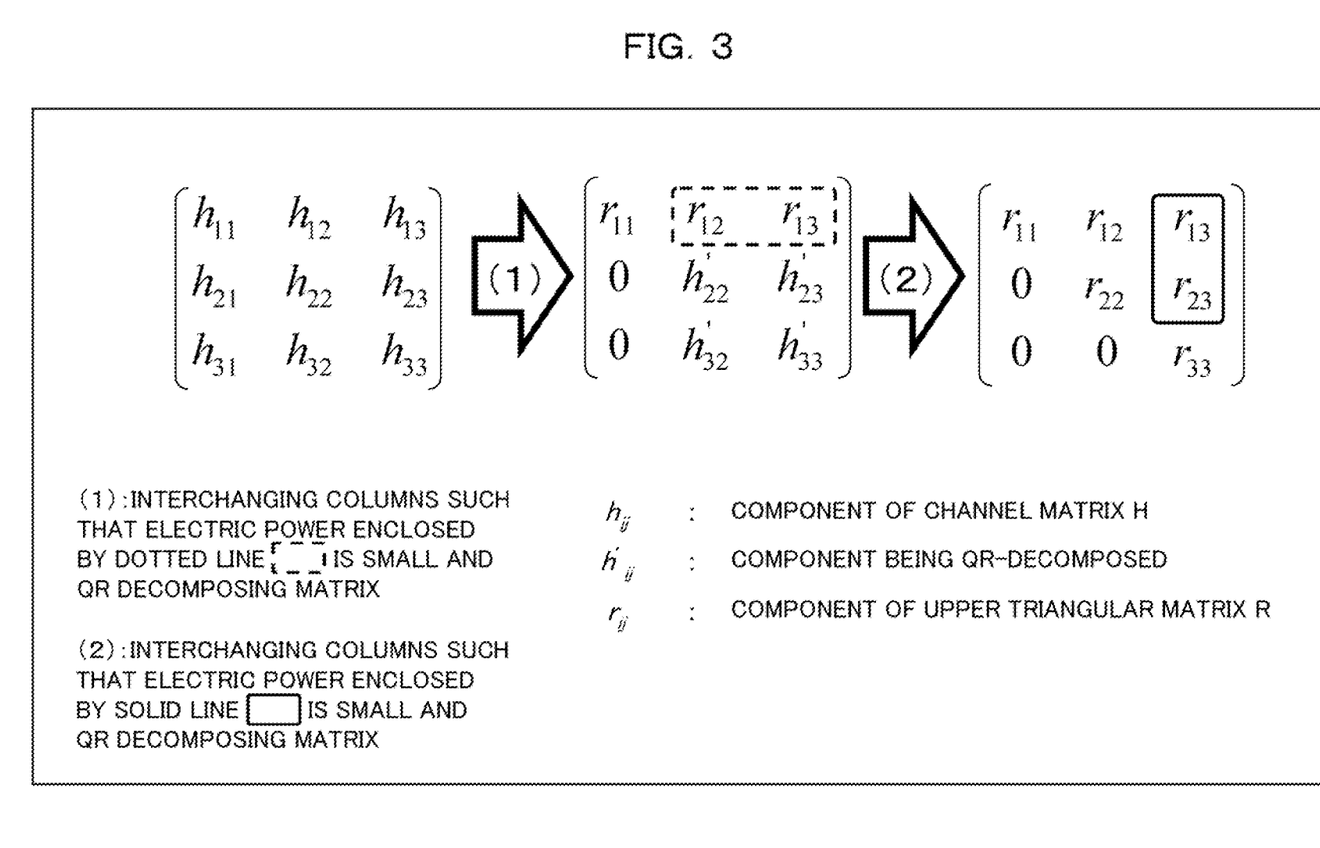
FIG. 3 is a diagram describing generation of an upper triangular matrix R by a QR decomposing unit according to a second embodiment.

(2) Second Embodiment:

Hereinafter, description will now be made in relation to a method of lessening an amount of calculation in the determination of the upper triangular matrix R by the QR decomposing unit 24 with reference to FIG. 3.

First of all, a column vector to be arranged in the first column is determined among the three column vectors ($[h_{11}\ h_{21}\ h_{31}]^T$, $[h_{12}\ h_{22}\ h_{32}]^T$, and $[h_{13}\ h_{23}\ h_{33}]^T$) constituting the channel matrix H.

Through the use of the Gram-Schmidt orthogonalization the first calculation triangulates the first column and, at the same time, determines $r_{12}$ and $r_{13}$. Determination of $r_{11}$ needs determination of $u_1$ ($=h_1$) based on the formula (14) and, after the determination of $u_1$, $q_1$ is determined from the formula (15). Thereby, $r_{12}=q_1^H h_2$ and $r_{13}=q_1^H h_3$ are determined.

On the basis of the above, the second embodiment carries out the QR decomposition for the cases where the three column vectors are each arranged in the first column. Accordingly, three combinations of the non-diagonal elements $r_{12}$ and $r_{13}$ can be obtained and the values of $|r_{12}|^2+|r_{13}|^2$ is calculated for respective three combinations among which the combination whose the value $|r_{12}|^2+|r_{13}|^2$ is the minimum is selected. In other words, the column vectors are interchanged such that the sum of the squares (the sum of the electric power) of the non-diagonal elements $r_{12}$ and $r_{13}$ enclosed by the dotted box in FIG. 3 is smaller, and then the interchanged matrix is QR-decomposed. The example of FIG. 3 assumes that the column vector $[h_{11}\ h_{21}\ h_{31}]^T$ is selected for the first column and the calculation proceeds to the next step.

Next, the vector to be arranged in the second column is either $[r_{11}\ h_{22}'\ h_{32}']^T$ or $[r_{13}\ h_{23}'\ h_{33}']^T$. The QR decomposition is carried out to calculate $r_{23}$ for both cases for the second column. Then, the values of $|r_{13}|^2+|r_{23}|^2$ are calculated and the vector corresponding to the smaller $|r_{13}|^2+|r_{23}|^2$ is selected. In other words, column vectors are interchanged such that the sum of the squares of the elements $r_{13}$ and $R_{23}$ (i.e., the sum of the electric power) enclosed by the solid box in FIG. 3 is smaller, and the interchanged matrix is then subjected to QR decomposition.

After that, an upper triangular matrix R which has second column having a smaller value of $|r_{13}|^2+|r_{23}|^2$ is determined (created) to be the upper triangular matrix R to be used in MIMO decoding.

As the above, since the second embodiment eliminates the requirements of calculating the sum of the squares of the non-diagonal elements for each of the possible patterns #k whose column vectors are interchanged one another differently from the first embodiment, the amount of calculation in the QR decomposing unit 24 can be reduced.

The above process is based on the Gram-Schmidt orthogonalization. Alternatively, the Householder transformation can be similarly applied because the first calculation triangulates the first column and concurrently obtains elements $r_{12}$ and $r_{13}$.

The second embodiment interchanges the column vectors on the basis of the electric power ($|\cdot|^2$) of the non-diagonal elements. Alternatively, the interchanging may be based on the amplitudes ($|\cdot|$).

Figure 4:
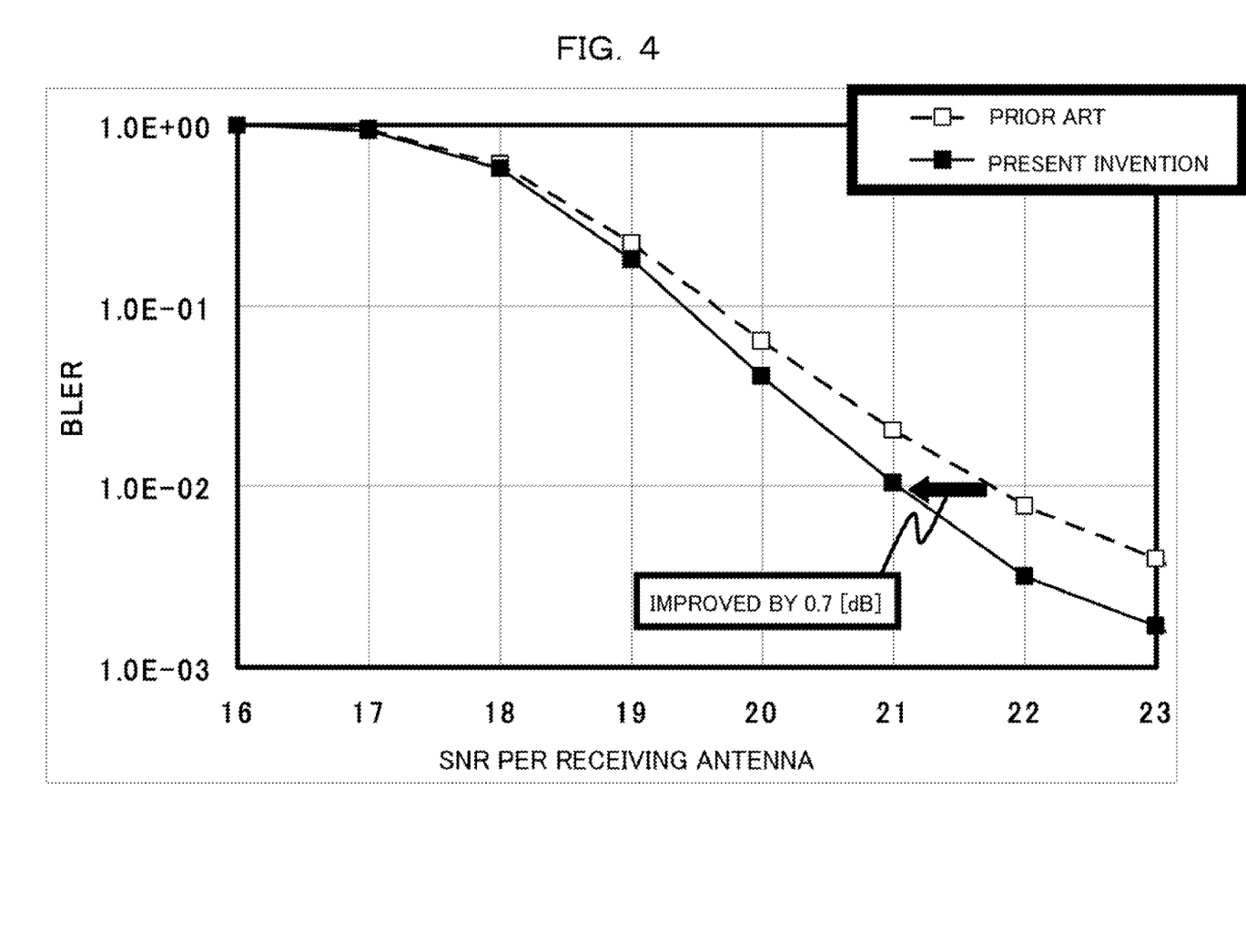
FIG. 4 is a graph denoting the relationship between an SNR per receiving antenna and a block error rate (BLER) in comparison to the conventional technique.

FIG. 4 denotes the results of computer simulation of characteristics of SNR (Signal to Noise Ratio) per antenna in the MIMO receiver to the block error rate (BLER) in conformity with the method of the second embodiment. The simulation is carried out under the assumptions of a 4×4 MIMO system having the number M of transmitting antenna being four and of the number N of receiving antenna being four and the multipath environment being a 6-ray typical urban model.

As denoted in FIG. 4, the embodiment represented by the solid line exhibited an improvement by about 0.7 dB at the BLER=0.01 as compared with a conventional technique (of Non-Patent Reference 2) represented by the dotted line, which means that the embodiment is superior in block error rate.

The embodiments detailed above can improve the accuracy of estimation of transmitted signals (i.e., MIMO decoding capability) in the MIMO communication.

In addition, the embodiments make it possible to attain a sufficient reception capability (decoding capability) at a receiver end in MIMO communication.

As detailed above, the embodiments can improve the accuracy of the estimation of the transmitted signal (i.e., MIMO decoding capability) in MIMO communication, and therefore seems to be extremely useful in the technical field of wireless communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method for Multiple Input Multiple Output (MIMO) decoding, based on a channel estimated value between a plurality of transmitting antennas and a plurality of receiving antennas, a received signal received by the plurality of receiving antennas, the method comprising:

in a process of obtaining a unitary matrix Q and a triangular matrix R through QR decomposition of a channel estimated value matrix H, creating the triangular matrix R such that a sum of scalars of non-diagonal elements of the triangular matrix R is the minimum; and estimating a signal transmitted from the plurality of transmitting antennas through the use of the created triangular matrix R, the unitary matrix Q, and the received signal received by the plurality of receiving antennas.

2. The method according to claim 1, further comprising, in a process of the creating of the triangular matrix R, creating the triangular matrix R such that a sum of electric power of the non-diagonal elements is the minimum.

3. The method according to claim 1, further comprising, in the creating of the triangular matrix R, creating the triangular matrix R such that a sum of amplitudes of the non-diagonal elements is the minimum.

4. The method according to claim 1, further comprising, in the creating of the triangular matrix R, interchanging columns such that a sum of scalars of non-diagonal elements is smaller.

5. The method according to claim 4, further comprising, in the creating of the triangular matrix R, interchanging columns such that a sum of electric power of the non-diagonal elements is smaller.

6. The method according to claim 4, further comprising, in the creating of the triangular matrix R, interchanging columns such that a sum of amplitudes of the non-diagonal elements is smaller.

7. The method according to claim 1, wherein the QR decomposition includes Gram-Schmidt orthgonalization or Householder transformation.

8. An apparatus for Multiple Input Multiple Output (MIMO) decoding, based on a channel estimated value between a plurality of transmitting antennas and a plurality of receiving antennas, a received signal received by the plurality of receiving antennas, the apparatus comprising:

a QR decomposing unit which creates, in a process of obtaining a unitary matrix Q and a triangular matrix R through QR decomposition of a channel estimated value matrix H, the triangular matrix R such that a sum of scalars of non-diagonal elements of the triangular matrix R is the minimum; and a MIMO decoding unit which estimates a signal transmitted from the plurality of transmitting antennas through the use of the created triangular matrix R, the unitary matrix Q, and the received signal received by the plurality of receiving antennas.

9. A MIMO receiver comprising the apparatus of claim 8.

\* \* \* \* \*